United States Patent [19]
Ferris

[11] 4,089,491
[45] May 16, 1978

[54] CAMOUFLAGED AIRCRAFT, SURFACE VESSEL OR VEHICLE OR THE LIKE

[76] Inventor: Carlisle Keith Ferris, 50 Moraine Rd., Morris Plains, N.J. 07950

[21] Appl. No.: 668,983

[22] Filed: Mar. 22, 1976

[51] Int. Cl.² ............................................. B64D 7/00
[52] U.S. Cl. ................................... 244/1 R; 89/36 R; 427/280; 428/195; 428/919
[58] Field of Search ......................... 244/1 R; 114/15; 89/36 R; 428/919, 195; 427/261, 280

[56] References Cited

U.S. PATENT DOCUMENTS

| 1,305,296 | 6/1919 | Mackay | 114/15 |
|---|---|---|---|
| 2,190,691 | 2/1940 | Barclay | 114/15 |
| 2,292,848 | 8/1942 | Robson | 114/15 |
| 3,967,026 | 6/1976 | Dalblom | 428/195 |

FOREIGN PATENT DOCUMENTS

| 615,111 | 2/1933 | Germany | 114/15 |
|---|---|---|---|

OTHER PUBLICATIONS

The Encyclopedia Americana, "Concealing Coloration," pp. 325–326a, Countershading and Disruptive Markings, p. 326b, 1964.

*Primary Examiner*—Stephen C. Bentley
*Attorney, Agent, or Firm*—Shlesinger, Arkwright, Garvey & Dinsmore

[57] ABSTRACT

A camouflaged aircraft, surface vessel, vehicle or the like comprising an aircraft having upper and lower surfaces and having a plurality of visually contrasting surface coatings thereon, the coatings having lines of demarcation therebetween the surface coatings comprising one light and one dark coating, the dark coating being on a major portion of the upper surface of said aircraft, the light coating being on a major portion of the lower surface of the aircraft, substantially all of the lines of demarcation of the coatings when viewed from the side of the aircraft generally paralleling the longitudinal axis of the aircraft, and substantially all of the lines of demarcation of the coatings when viewed from above the aircraft being generally diagonal with respect to the longitudinal axis of the aircraft and substantially all of the lines of demarcation running in substantially the same direction.

45 Claims, 16 Drawing Figures

CAMOUFLAGED AIRCRAFT, SURFACE VESSEL OR VEHICLE OR THE LIKE

THE FIELD OF INVENTION

This invention relates to aircraft, surface vessels or vehicles or the like having camouflage or deceptive coatings thereon for the purpose of hiding, or confusing the enemy.

HISTORICAL BACKGROUND

The use of camouflage for military vehicles, such as aircraft, ships, rockets, tanks, trucks and the like is well known. World War I aircraft, surface vessels including ships and tanks used various camouflage techniques. In later wars, the techniques were developed with various paint schemes to dazzle or confuse the eyes. Mackay, U.S. Pat. No. 1,305,296 was an early patent showing a technique for rendering objects less visible by using multi-colors in splotch fashion. Brush et al, U.S. Pat. No. 715,013 was an even earlier development using three basic colors in which the darkest color was placed on the top of the vessel with subsequent use of lighter colors on the lower surfaces of the vessel. The idea in general was to kill the contrast of light and shade.

More recently, Barclay, U.S. Pat. No. 2,190,691 and Robson, U.S. Pat. No. 2,292,848 show various techniques for camouflaging vessels including aircraft for the purpoe of confusing the enemy so as to make it difficult for him to determine actual size and shape of a moving body.

There are many other publications in the area of camouflage including U.S. Naval Institute Proceedings Publications of July, 1971 which provide photographs of various surface ships and varying camouflage techniques, most of which provide "dazzle" effects.

When an object is viewed against the sky, things grow smaller in size with distance and they also grow progressively lighter in value and less distinct or more grey in color. The effect of sun or other light sources on surfaces cause problems with reflected light and shadow as they form over the object.

OBJECTS AND SUMMARY

It is an object of this invention to provide a camouflage scheme which will delay visual acquisition by the enemy. It is another object of this invention to provide a camouflage scheme which will make continued visual contact difficult once acquired.

Yet a further object of this invention is to provide a camouflage scheme which will disguise aircraft, ships, or other type vehicles as to their type and identity.

Another object of this invention is to provide a camouflage scheme which will impair the estimation of range and speed.

Still a further object of this invention is to provide a camouflage scheme which will disguise the attitude, the angle, and the actual direction of the aircraft, surface vessel or vehicle or the like.

A further object of this invention is to provide a camouflage scheme which will delay recognition of the actions of the object by disruption of visual clues.

A still further object of this invention is to provide a camouflage scheme which will prompt indecision and induce mistakes on the part of an opponent.

Still yet another object of this invention is to provide a camouflage scheme which is secondarily directed towards concealment but primarily towards confusion.

More specifically an object of this invention is to provide a camouflage scheme which causes the eyes to fix themselves on false lines of demarcation, thereby causing them to lose sight of true lines of demarcation.

Another object of this invention is to provide a camouflage scheme which uses basically three coatings of varying contrasts from light to dark.

Still a further object of this invention is to provide a camouflage scheme which uses basically flat coatings including such coatings as dark, medium and light grey.

Another object of this invention is to provide certain lines of demarcation which are somewhat irregular but when viewed from the side follow the longitudinal axis of the object and when viewed from the top or bottom are diagonal to the longitudinal axis of the object.

A further object of this invention is to provide a camouflage scheme which breaks up the leading and trailing edges of the wings and vertical and horizontal stabilizers with bites out of the darker coatings.

Still a further object of this invention is to provide rectangular or triangular bites to the leading and trailing edges of the wings and stabilizers of contrasting coatings to those immediatedly adjacent thereto.

A further object of this invention is to provide a camouflage scheme for an aircraft which provides a false cockpit-canopy on the underside of the aircraft in the direct line position of the real cockpit-canopy.

Yet a further object of this invention is to provide coatings which are contrasted not only visually, but by their anti-infrared character are difficult to view with special electronic equipment and which will tend to confuse or otherwise break up reflected rays picked up by such equipment and translated thereby.

Yet another object of this invention is to provide a camouflage scheme which avoids the weakness of the present "plug-type" camouflage schemes thereby to disrupt the outline of the object.

In summary, therefore, this invention is directed to a camouflage scheme which can be readily adapted to all types of surface and air vehicles and which, as its main object, to confuse the enemy.

In the accompanying drawings which illustrate by way of example various embodiments of this invention:

FIG. 2 is a diagram showing coating application to various curved surfaces on an aircraft or the like;

FIGS. 1 THROUGH 4

Figure 1:
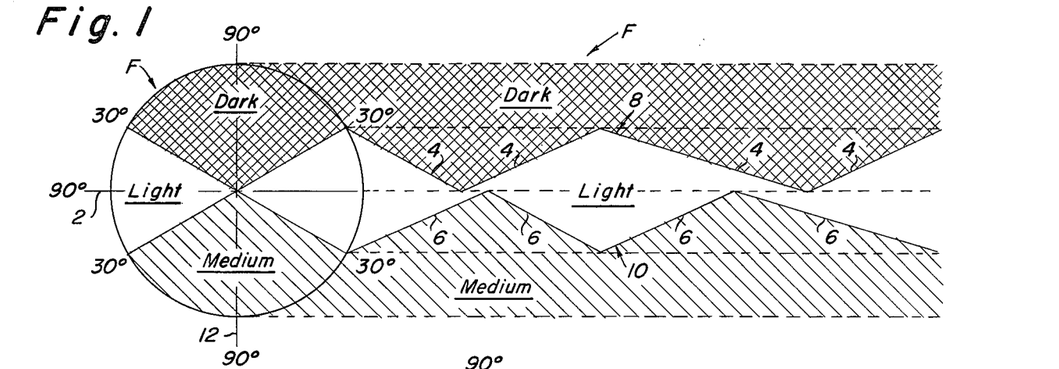
FIG. 1 is a diagram showing one aspect of the coating scheme.

In FIG. 1, the circular area to the left of figure diagrammatically shows a fuselage F in cross-section. Diagrammatically to the right, we note the fuselage from the side. The coatings on the fuselage are indicated as dark, medium and light. The coatings may be painted, anodized, laminated or otherwise applied to the surface of the aircraft, or other type air or surface vehicle. The coatings may be of any type of paint, dye or other material. They may be colors but it is preferred that the dark coating be a dark grey, that the medium coating be a medium grey and the light coating be a light grey. In general, three shades or colors are applied, however, in an emergency, two different coatings may be applied, namely, a dark coating and a light coating with substantial constrast therebetween.

In FIG. 1, the horizontal is generally indicated at 2 and the lines of demarcation between the shades or colors, are generally indicated at 4 and 6. It is to be noted that the lines of demarcation 4 and 6, though irregular, extend generally in the direction of horizontal 2 which is generally in the direction of the longitudinal axis of the aircraft. The lines 4 and 6 are of unequal lengths following in general the principle that no two items on the object on which the camouflage system is used are camouflaged in an identical fashion. It is to be noted that pairs of short lines comprising lines 4 and 6 form scallops 8 and 10 which are in effect bites of light coatings L into the dark and medium coatings D and M. The lines 4 and 6 as shown in FIG. 1 are sharply definitive and are provided with hard edges. Though scallops may be curved, it is preferred that they be angular and without soft or rounded peaks and valleys as this adds to difficulty in perceiving form. The darker shades or colors in contrast to the light or medium shades or colors are applied on the top surface of the fuselage F. The purpose is to kill the highlights and to lessen the reflectivity. It is preferred that flat rather than gloss paints be used. It will be noted, that the 90° vertical line 12 which extends above and below the horizontal line 2 enables one to determine the height to which the scallops extend into the darker shade or color. Thus, the scallops will extend from 0° to 30° above or below the horizontal as indicated. It will thus be seen that on aircraft, the preferred medium grey flat paint will be on a substantial portion of the bottom of the aircraft and the preferred dark grey flat paint will be on a substantial portion of the top of the aircraft. The light grey flat paint will be generally applied along the side surfaces between the dark and medium flat greys.

Figure 2:
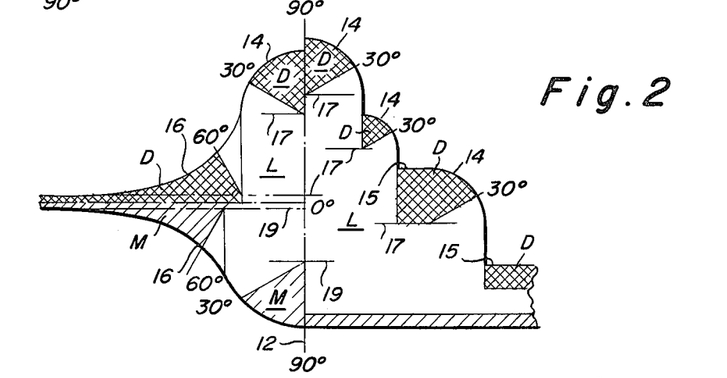
Figure 3:
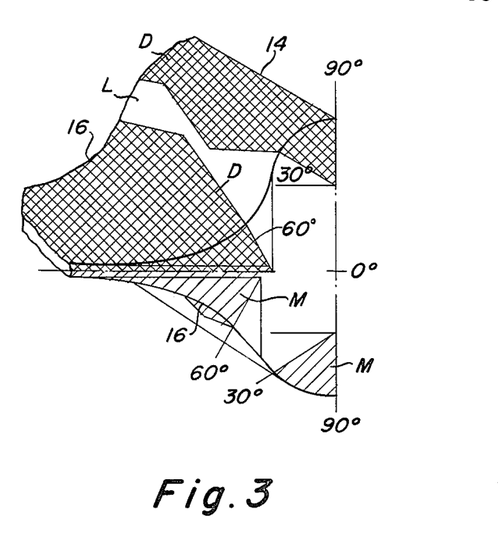
FIG. 3 and FIG. 4 are diagrammatic perspective views of the left and right sides respectively of the diagram shown in FIG. 2.
Figure 4:
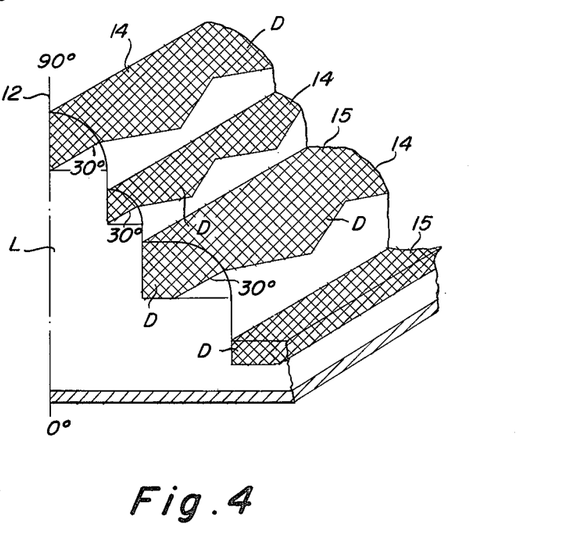

Referring to FIGS. 2, 3 and 4, it will be noted that wherever there are convex surfaces 14 the color scheme in general will be dark. As will be subsequently described, the major portion of the upper surface of the aircraft and preferably approximately about two-thirds, will be painted dark. The remaining minor portion of the aircraft or approximately one-third will be painted with lighter paints such as the light and medium greys. The under surface or bottom of the aircraft or vehicle will have the lighter shades or colors and the medium or light shades will vary from approximately 40% to approximately 60% of the bottom of the aircraft, though the preferred scheme would be approximately about 50% of the light or medium paints or coatings.

It should be noted that all upper horizontal flat surfaces 15 will in general have the dark flat color or shade thereon. The application of the dark or medium color to the aircraft as a rule applied to the major curved surfaces of the aircraft.

The concave surfaces 16, as illustrated in FIGS. 2 and 3, have applied to them a dark or medium coating as illustrated in FIGS. 2 and 3. In these instances, the coatings form scallops which extend on either side of a horizontal line such as 17 and 19 respectively, a distance of from 60° to 90° from above or below the horizontal lines 17 and 19 as the case may be depending upon whether the concave surface is on the top or on the bottom of the aircraft as illustrated in FIGS. 2 and 3.

FIGS. 5 THROUGH 8

In FIGS. 5 through 8, an aircraft 20 has a cockpit-canopy 22 and is provided with wings 24 and 26, horizontal stabilizers 28 and 30, and a vertical stabilizer 32. Engine air scoops 34 and 36 are shown in advance of the wings 24 and 26.

Figures 5, 6, 7:
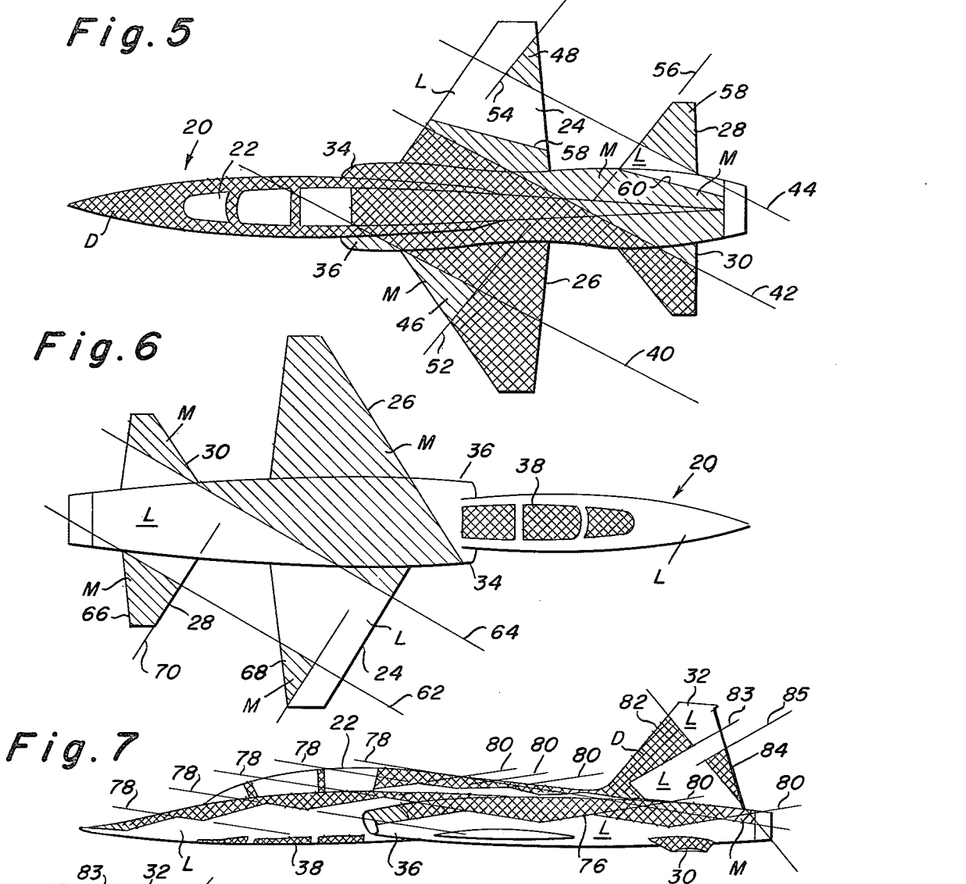
FIGS. 5, 6, 7 and 8 are respectively the top and bottom plan views and left and right side elevation views of an aircraft embodying the camouflage scheme of this invention.

In FIG. 6, a detail cockpit-canopy 38 similar to cockpit-canopy 22 is painted on the under portion or bottom of the aircraft 20.

The camouflage scheme is painted or otherwise affixed to the aircraft 20 as illustrated with the dark colors on the upper surface of the aircraft approximately two-third of the total surface area as illustrated in FIG. 5 with the medium and light shades or colors covering the other one-third of the upper surface of the aircraft. The dark coloration is indicated by D, the intermediate coating is indicated at M, and the light coating is indicated at L. It will be noted that the detail of the cockpit-canopy 38 will be painted dark on the bottom of the aircraft. It will be further noted, that the lines of demarcation 40, 42 and 44 are substantially parallel to each other and extend diagonally with respect to the longitudinal axis of the aircraft. Wherever there is a bite 46, 48 or 50 from the leading or trailing edge of the aircraft, it will be noted that the lines intersecting lines 40, 42 and 44 along the other edge of the bites 46, 48 and 50 will be substantially parallel.

In order to provide substantial contrast and to maintain the rule that no two surfaces look alike, the intermediate coating M is applied to the surfaces of the intake 36 and the bites 46, 48 and 50.

In order to provide contrast, occasionally, a line of demarcation such as lines 58 and 60 will extend somewhat diagonally but run in the same direction as lines of demarcation 40, 42 and 44. It is important that the shade or color next to the dark area D be the intermediate color or shade M.

The bottom of the aircraft is provided with intermediate color scheme M as shown having lines of demarcation 62 and 64 which are parallel to each other and diagonal to the longitudinal axis of the aircraft. Where bites 66 and 68 are taken from the portion of the leading or trailing edges of the wings 24 or the horizontal stabilizer 28, the other edge of the bite will have lines of demarcation 70 and 72 which are generally parallel.

Figure 8:
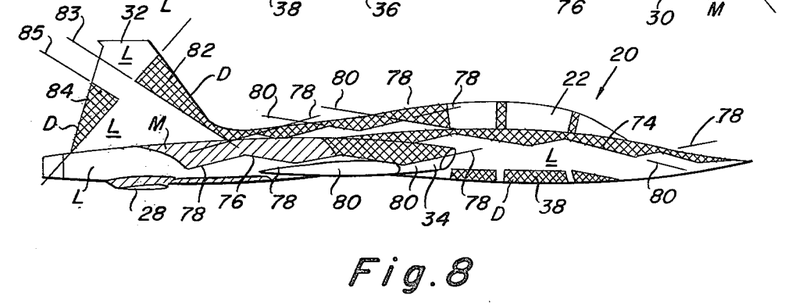
Figures 9, 10:
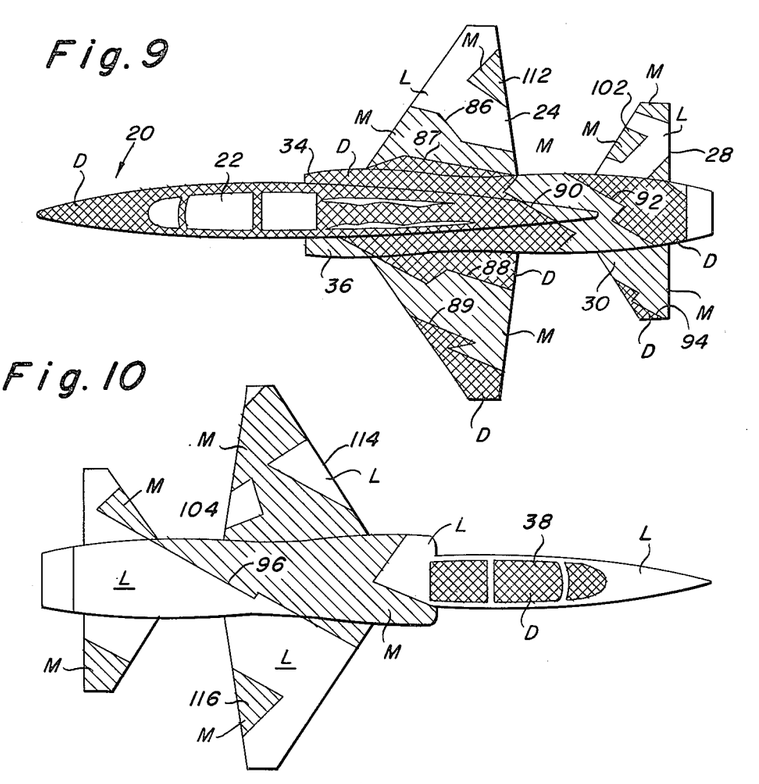
FIGS. 9, 10, 11 and 12 are respectively the top and bottom plan views and the left and right side elevation views of an aircraft embodying a modified version of the camouflage scheme of this invention.
Figure 11:
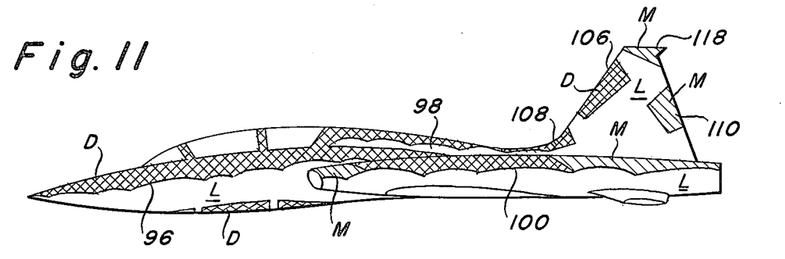
Figure 12:
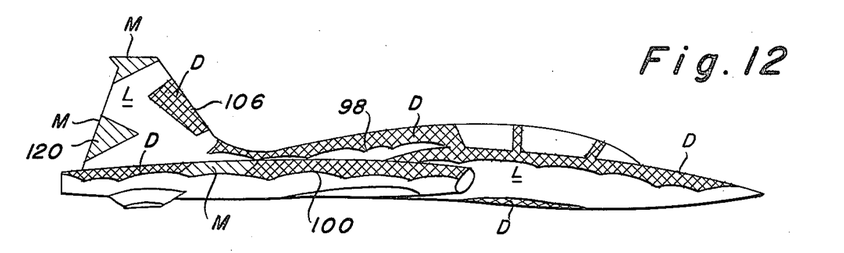

In accordance with the scheme as illustrated and described for FIGS. 1 through 4, the side elevation views of the aircraft FIGS. 7 and 8, will have scallops extending from front to rear of the aircraft. It will be noted that the lines of demarcation 74 and 76 in general appear to run from front to rear along the longitudinal axis of the aircraft. The scallops formed in the lines, are shown to have matching lines extending in a parallel relationship as illustrated by lines 78 and 80.

Bites 82 and 83 on the vertical stabilizer 32 are taken from the leading and trailing edge thereof. Wherever possible, lines 84 and 85 are parallel as illustrated.

FIGS. 9 THROUGH 12

In FIGS. 9 through 12, the same aircraft illustrated in FIGS. 5 through 8 is shown with a slightly modified camouflage scheme. It will be noted, that in this version, the one-third two-third light to dark system is applied to the upper surface of the aircraft 20 and the 40 to 60% light to medium is applied to the lower or bottom surface of the aircraft 20.

The primary difference in the scheme illustrated in these figures is that the lines of demarcation 86, 87, 88, 89, 90, 92, 94 and 96 are zigzag though portions of these lines of demarcation extend parallel to other lines and diagonally across the surface of the aircraft with respect to the longitudinal axis of the aircraft 20.

It will also be noted that the lines of demarcation 96, 98 and 100 of the scalloped effect are softer and somewhat curved but still extend along the longitudinal axis of the aircraft.

It should also be noted that rectangular bites 102, 104, 106, 108, and 110 are used with triangular bites 112, 114, 116, 118 and 120.

In general, the dark D, medium M and light L shadings are as shown.

Figure 13:
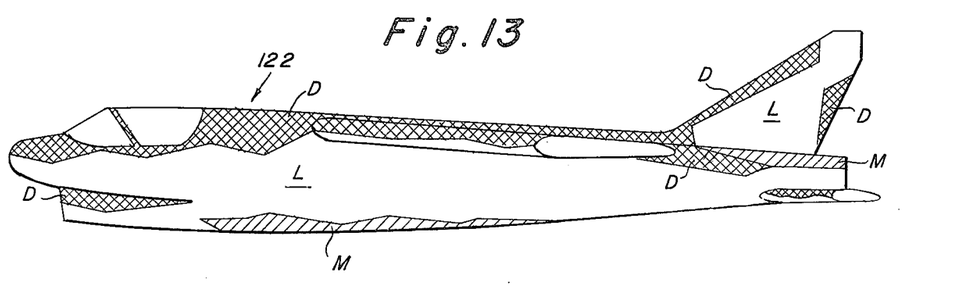
FIGS. 13, 14 and 15 are respectively the left side elevation view and the top and bottom plan views of an aircraft embodying a modified version of the camouflage scheme of this invention.
Figure 14:
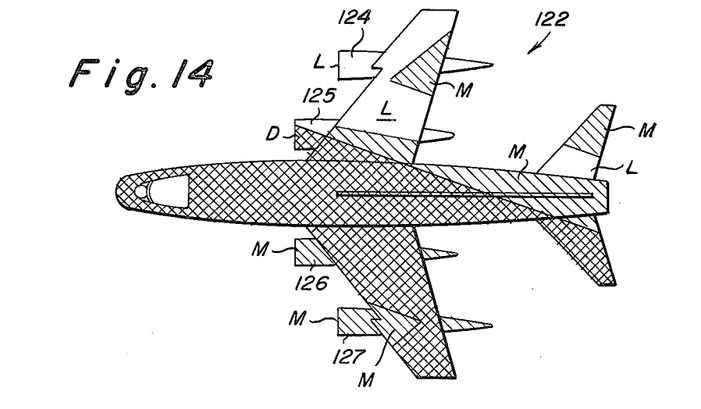
Figures 15, 16:
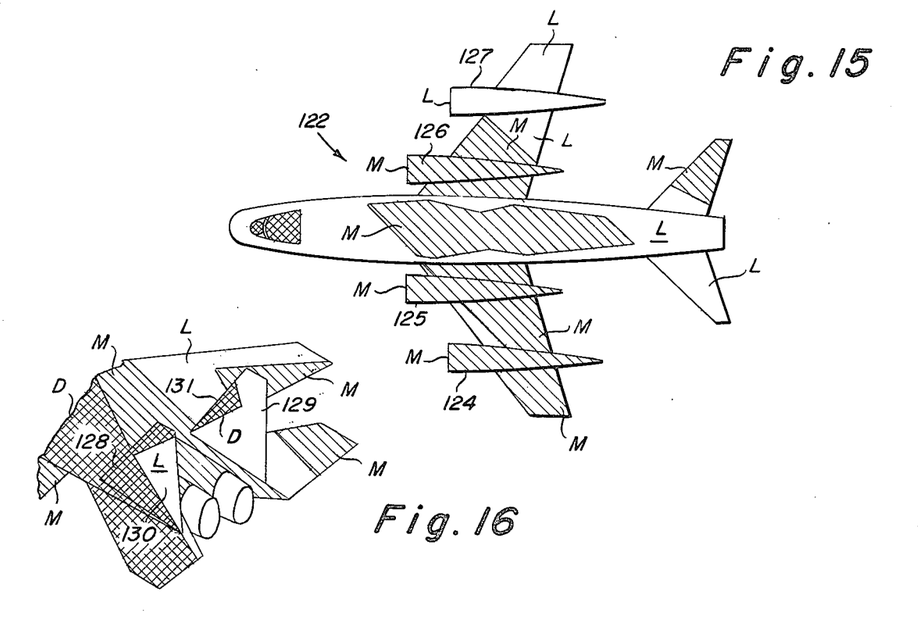
FIG. 16 is a fragmentary perspective view showing the tail portion of an aircraft having two vertical stabilizers embodying a modified version of the camouflage scheme of this invention.

FIGS. 13 THROUGH 15

In FIGS. 13 through 15, the aircraft 122 follows the scheme aforementioned for the aircraft shown in the previous figures. The coating scheme is illustrated by the light L, dark D, and intermediate shade M. Where engine nacelle 124, 125, 126 and 127 are added as in FIGS. 14 and 15, a pattern is used to break up the visual perception in that nacelle 124 is light, nacelle 125 is dark, and nacelle 126 and 127 are medium shades.

FIG. 16

FIG. 16 illustrates an aircraft having two vertical stabilizers 128 and 129. In order to produce confusion and to make the stabilizers appear as one when viewed at a perspective angle, the pattern painted on stabilizer 128 is substantially reversed on stabilizer 129. Note, for example that bite 130 on the vertical stabilizer 125 is at the trailing edge of the stabilizer and that the bite 131 is on the leading edge of the stabilizer 129. Note also the reversal of the color schemes, whereby the bite 131 is dark whereas the bite 130 is light. The balance of the stabilizers are also reversed in color scheme or shade. In the instance shown, the dark and light combination is illustrated. Where there are more than two stabilizers, the stabilizers on either side of the central stabilizer will be dissimilar.

To summarize certain aspects of this invention, it will be noted in addition to the above, that for the aircraft shown, the light L and dark D coatings are major portions of the sides of the aircraft, vessel, vehicle or the like, whereas the third or intermediate coating M is a minor portion of the sides. Generally, where stabilizers or wings or the like are a portion of the object camouflaged, at least a portion of one of the coatings includes a triangular bite from a portion of another of said coatings.

As aforenoted, the light and third or intermediate coats L and M may vary with respect to each other and constitute from about 40% to 60% of the bottom of the aircraft and preferably about 50%. Additionally, the wingtips of aircraft should have dissimilar coatings.

The degree of coating on the top or bottom surfaces as described angularly in FIGS. 1 to 4 can also be generally stated as a coating extending on the curved surfaces from about 10 o'clock to about 2 o'clock for a major portion of its length. Where two coatings only are used, the general rules for the dark coating apply with the balance being the light coating.

In general, for determining the area of scalloping, as in the case of a curved surface of less than a full arc of 90°, the horizontal is determined by the transition line between it, and the next adjacent surface which may be the begining of a flat surface or a curved surface in the reverse direction, or a curved surface in the same direction, having a different arc. In some instances, there may be no curved surface and the upper or lower surfaces of the aircraft or other vehicle may have downwardly or upwardly sloping flat surfaces respectively. The horizontal in these instances is determined as in the case of curved surfaces by the transition point between it and the next adjacent surface. If however, the flat surface is at an angle of more than 60° above the horizontal, it should be coated with a light coating, not a dark or medium, since as a general rule, vertical or nearly vertical surfaces are generally light and horizontal surfaces dark or medium.

While this invention has been described, it will be understood that it is capable of further variations uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A camouflaged and deceptive perception distorted vehicle comprising:
    a. a top surface, a bottom surface and upper and lower side surfaces,
    b. said top and side surface having a plurality of visually contrasting surface areas thereon,
    c. said top surface having left and right side areas,
    d. said contrasting surface areas having lines of demarcation therebetween
    e. said contrasting surface areas comprising a light area and a darker area,
    f. said darker area being solid and substantially unbroken and substantially covering all of one of said left and right side areas of said top surface,
    g. said light area substantially covering the remaining portion of the other of said left and right side surface areas of said top surface, and
    h. substantially all of the lines of demarcation of said contrasting surface areas of said side surface of said vehicle substantially paralleling the longitudinal axis of said vehicle, and
    i. substantially all the lines of demarcation of said contrasting surface areas of said vehicle on said top surface being substantially diagonal with respect to the longitudinal axis of said vehicle and run in substantially the same direction.

2. A camouflaged vehicle as in claim 1 and wherein:
    a. said darker area includes a dark portion and an intermediate dark-light portion.

3. A camouflaged vehicle as in claim 1 and wherein:

a. said darker area covers at least about ⅔ of said top surface; and
b. said light area covers the remaining portion of said top surface.

4. A camouflaged vehicle as in claim 2 and wherein:
a. said dark portion of said darker area covers about 170 of said top surface, and
b. said intermediate dark-light portion of said darker area and said light area cover the remaining about ⅓ of said top surface.

5. A camouflaged vehicle as in claim 2 and wherein:
a. said bottom surface includes a plurality of visually contrasting surface areas thereon,
b. said bottom contrasting surface areas having lines of demarcation therebetween,
c. said bottm contrasting surface areas including an intermediate dark-light portion and a light portion,
d. said portions of said bottom contrasting surface areas being from about 40% to 60% in proportion to each other.

6. A camouflaged vehicle as in claim 5 and wherein:
a. said portions of said bottom contrasting surface areas are about 50% each.

7. A camouflaged vehicle as in claim 5 wherein:
a. substantially all of said lines of demarcation of said bottom surface visually contrasting areas are substantially diagonal with respect to the longitudinal axis of said vehicle and run in substantially the same direction.

8. A camouflaged vehicle as in claim 4 and wherein:
a. said visually contrasting surfaces of said upper and lower side surfaces have said intermediate dark and light portion of said darker area substantially solid and covering a minor portion thereof, and
b. said dark portion of said darker area and said light area being a major portion thereof.

9. A camouflaged vehicle as in claim 1 and wherein:
a. said lines of demarcation run in a plurality of parallel lines.

10. A camouflaged vehicle as in claim 1 and wherein:
a. at least one of said upper and lower side surfaces includes a series of scallops extending in a direction from front to rear of said vehicle along a line of demarcation.

11. A camouflaged vehicle as in claim 10 and wherein:
a. said scallops each include a pair of lines of different length.

12. A camouflaged vehicle as in claim 10 and wherein:
a. said scallops in a series include from about 5 to 9.

13. A camouflaged vehicle as in claim 10 and wherein:
a. said scallops are located on longitudinally extending curved surfaces having an arc of approximately 90° from the horizontal.

14. A camouflaged vehicle as in claim 13 and wherein:
a. said scallops have their beginning at the horizontal of an arc of about 90° to the verticle and peak at about 30° above or below the horizontal and said curved surfaces arc convex.

15. A camouflaged vehicle as in claim 10 and wherein:
a. said scallops are on said upper side surface.

16. A camouflaged vehicle as in claim 10 and wherein:
a. said scallops are on said lower side surface.

17. A camouflaged vehicle as in claim 10 and wherein:
a. said scallops are on the upper and lower side surfaces of said vehicle and in opposed relation to each other.

18. A camouflaged vehicle as in claim 15 and wherein:
a. said scallops are of said light area and cut from said darker area.

19. A camouflaged vehicle as in claim 1 and wherein:
a. said lower side surface includes a series of scallops extending in a direction from front to rear of said vehicle along one of said lines of demarcation.

20. A camouflaged vehicle as in claim 2 and wherein:
a. said darker area includes a dark portion and an intermediate dark-light portion, and
b. said lower side surface includes a series of scallops extending in a direction from front to rear of said vehicle along one of said lines of demarcation, and
c. said scallops are of said light area cut from said intermediate dark-light portion.

21. A camouflaged vehicle as in claim 10 and wherein:
a. said scallops in a series include about 7.

22. A camouflaged vehicle as in claim 2 and wherein:
a. said light area is a light flat grey,
b. said dark portion is a dark flat grey,
c. said intermediate dark-light portion is a flat intermediate said flat light grey and said flat dark grey.

23. A camouflaged vehicle as in claim 1 and wherein:
a. said vehicle includes a pair of verticle stabilizers,
b. each of said stabilizers including a plurality of visually contrasting areas including one darker area and one light area having lines of demarcation therebetween, and
c. said contrasting areas on one stabilizer of said pair being the reverse of said contrasting areas on the other stabilizer of said pair.

24. A camouflaged vehicle as in claim 1 and wherein:
a. said vehicle includes a cockpit-canopy on the top surface thereof, and
b. said vehicle includes a simulation of said cockpit-canopy on the bottom surface thereof.

25. A camouflaged vehicle as in claim 1 and wherein:
a. said vehicle includes a pair of wings including wing tips and one wing of said pair having a solid darker area substantially over the entire upper surface of said one wing including said wing tip, and
b. the other wing of said pair having a light area on the upper surface thereof including the wing tip thereof.

26. A camouflaged vehicle as in claim 1 and wherein:
a. said upper side surface includes said darker area from approximately a position of about 10 o'clock to a position of about 2 o'clock for a major portion of its length.

27. A camouflaged vehicle as in claim 1 and wherein:
a. said contrasting surface areas each have different anti-infrared reflectivities.

28. A camouflaged vehicle as in claim 2 and wherein:
a. said intermediate dark-light portion is always adjacent said dark portion.

29. A camouflaged vehicle as in claim 28 and wherein:
a. said light area is always adjacent said intermediate dark-light portion.

30. A camouflaged vehicle as in claim 13 and wherein:

a. said scallops have their beginning at the horizontal of an arc about 90° to vertical and peak at about 60° above or below said horizontal and said curved surface is concave.

31. A camouflaged vehicle as in claim 1 and wherein:
a. said vehicle includes a real cockpit-canopy on said top surface,
b. a simulated cockpit-canopy on said bottom surface positioned substantially in the same general area longitudinally of said fuselage as said real cockpit-canopy so that,
c. only one of said canopies is visible when said aircraft is perceived from directly above said top surface or directly below said bottom surface.

32. A camouflaged vehicle as in claim 31 and wherein:
a. a substantial portion of said simulated cockpit-canopy is similar in outline to said real cockpit-canopy.

33. A camouflaged vehicle as in claim 31 and wherein:
a. said vehicle includes a nose and a tail and said simulated cockpit-canopy is positioned from said nose and tail a distance substantially the same as said real cockpit-canopy and in substantial spaced registration therewith.

34. A camouflaged vehicle as in claim 31 and wherein:
a. said simulated cockpit-canopy is paint and is a general outline of said real canopy.

35. A camouflaged vehicle as in claim 31 and wherein:
a. said bottom surface includes a light area and a substantial portion of said simulated cockpit-canopy is dark on said light area.

36. A camouflaged vehicle as in claim 31 and wherein:
a. said simulated cockpit-canopy is generally dark in coloration.

37. A camouflaged vehicle as in claim 36 and wherein:
a. said simulated cockpit-canopy includes light detail.

38. A camouflaged and deceptive perception distorted aircraft comprising:

a. an aircraft fuselage having nose and tail, and top, side and bottom surfaces,
b. a real cockpit-canopy on said top surface,
c. a simulated cockpit-canopy on said bottom surface positioned substantially in the same general area longitudinally of said fuselage as said real cockpit-canopy so that,
d. only one of said canopies is visible when said aircraft is perceived from directly above said top surface or directly below said bottom surface.

39. A camouflaged and deceptive perception distorted aircraft as in claim 38 and wherein:
a. a substantial portion of said simulated cockpit-canopy is similar in outline to said real cockpit-canopy.

40. A camouflaged and deceptive perception distorted aircraft as in claim 38 and wherein:
a. said simulated cockpit-canopy is positioned from said nose and tail a distance substantially the same as said real cockpit-canopy and in substantial spaced registration therewith.

41. A camouflaged and deceptive perception distorted aircraft as in claim 38 and wherein:
a. said simulated cockpit-canopy is paint and is a general outline of said real canopy.

42. A camouflaged and deceptive perception distorted aircraft as in claim 38 and wherein:
a. said bottom surface includes a light area and a substantial portion of said simulated cockpit-canopy is dark on said light area.

43. A camouflaged and deception perception distorted aircraft as in claim 42 and wherein:
a. said simulated cockpit-canopy is positioned from said nose and tail a distance substantially the same as said real cockpit-canopy and in substantially spaced registration therewith.

44. A camouflaged and deception perception distorted aircraft as in claim 38 and wherein:
a. said simulated cockpit-canopy is generally dark in coloration.

45. A camouflaged and deception perception distorted aircraft as in claim 44 and wherein:
a. said simulated cockpit-canopy includes light detail.

* * * * *

UNITED STATES PATENT AND TRADEMARK OFFICE
CERTIFICATE OF CORRECTION

PATENT NO. : 4,089,491
DATED : May 16, 1978
INVENTOR(S) : Carlisle Keith Ferris

It is certified that error appears in the above-identified patent and that said Letters Patent are hereby corrected as shown below:

IN CLAIM 4:
Column 7, line 7, "170" should read --2/3--.

Signed and Sealed this

Twentieth Day of October 1981

|SEAL|

Attest:

GERALD J. MOSSINGHOFF

Attesting Officer    Commissioner of Patents and Trademarks

REEXAMINATION CERTIFICATE (570th)
United States Patent [19]
Ferris

[11] B1 4,089,491
[45] Certificate Issued  Sep. 23, 1986

[54] CAMOUFLAGED AIRCRAFT, SURFACE VESSEL OR VEHICLE OR THE LIKE

[76] Inventor: Carlisle K. Ferris, 50 Moraine Rd., Morris Plains, N.J. 07950

Reexamination Request:
No. 90/000,904, Nov. 14, 1985

Reexamination Certificate for:
Patent No.: 4,089,491
Issued: May 16, 1978
Appl. No.: 668,983
Filed: Mar. 22, 1976

Certificate of Correction issued Oct. 20, 1981.

[51] Int. Cl.$^4$ .................................... B64D 7/00
[52] U.S. Cl. ................................. 244/1 R; 89/36.01; 427/280; 428/195; 428/919
[58] Field of Search .............. 89/36.01, 36.11; 244/1 R, 119, 120, 129.3; 428/919

[56] References Cited
U.S. PATENT DOCUMENTS

| | | | |
|---|---|---|---|
| D. 127,413 | 5/1941 | Theodoropulos | 244/119 |
| 1,045,152 | 11/1912 | Kelsey | 244/129.3 |
| 1,305,296 | 6/1919 | MacKay | 114/15 |
| 2,190,691 | 2/1940 | Barclay | 114/15 |
| 2,292,848 | 8/1942 | Robson | 114/15 |
| 3,690,600 | 9/1972 | Cooper | 244/120 |
| 3,967,026 | 6/1976 | Dalblom | 428/195 |

OTHER PUBLICATIONS

Popular Aviation, vol. XXV, No. 5, 1939, p. 62, Modern Camouflage (Figure 87) by R. P. Breckenridge, published by Fanar & Rienhart, Inc., Copyright 1942.

*Primary Examiner*—Stephen C. Bentley

[57] ABSTRACT

A camouflaged aircraft, surface vessel, vehicle or the like comprising an aircraft having upper and lower surfaces and having a plurality of visually contrasting surface coatings thereon, the coatings having lines of demarcation therebetween the surface coatings comprising one light and one dark coating, the dark coating being on a major portion of the upper surface of said aircraft, the light coating being on a major portion of the lower surface of the aircraft, substantially all of the lines of demarcation of the coatings when viewed from the side of the aircraft, and substantially all of the lines of demarcation of the coatings when viewed from above the aircraft being generally diagonal with respect to the longitudinal axis of the aircraft and substantially all of the lines of demarcation running in substantially the same direction.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–37 is confirmed.

Claims 38, 39, 41 and 43 are cancelled.

Claims 40, 42 and 44 are determined to be patentable as amended.

Claim 45 dependent on an amended claim, is determined to be patentable.

New claims 46–51 are added and determined to be patentable.

40. A camouflaged and deceptive perception distorted aircraft as in claim [38] *46* and wherein:
   a. said simulated cockpit-canopy is positioned from said nose and tail a distance substantially the same as said real cockpit-canopy and in substantial spaced registration therewith.

42. A camouflaged and deceptive perception distorted aircraft as in claim [38] *46* and wherein:
   a. said bottom surface includes a light area and a substantial portion of said simulated cockpit-canopy is dark on said light area.

44. A camouflaged and deception perception distorted aircraft as in claim [38] *46* and wherein:
   a. said simulated cockpit-canopy is generally dark in coloration.

*46. A camouflaged and deceptive perception distorted aircraft comprising:*
   *a) an aircraft fuselage having nose and tail and top, side and bottom surfaces;*
   *b) a real cockpit-canopy on said top surface;*
   *c) a simulated cockpit-canopy on said bottom surface positioned substantially in the same general area longitudinally of said fuselage as said real cockpit-canopy, so that,*
   *d) only one of said canopies is visible when said aircraft is perceived from directly above said top surface or directly below said bottom surface; and,*
   *e) said simulated cockpit-canopy being paint and being a general outline of said real cockpit-canopy.*

*47. A camouflaged and deceptive perception distorted aircraft comprising:*
   *a) an aircraft fuselage having nose and tail, and top, side and bottom surfaces;*
   *b) a real cockpit-canopy on said top surface;*
   *c) a simulated cockpit-canopy on said bottom surface positioned substantially in the same general area longitudinally of said fuselage as said real cockpit-canopy so that,*
   *d) only one of said canopies is visible when said aircraft is perceived from directly above said top surface or directly below said bottom surface; and,*
   *e) a coating on the bottom surface of said aircraft fuselage outlining said simulated cockpit-canopy.*

*48. A camouflaged and deceptive perception distorted aircraft as in claim 47 and wherein said simulated cockpit-canopy is detailed on the bottom of said fuselage.*

*49. A camouflaged and deceptive perception distorted aircraft as in claim 47 and wherein:*
   *a) said coating is an anodized coating.*

*50. A camouflaged and deceptive perception distorted aircraft as in claim 47 and wherein:*
   *a) said coating is a lamination.*

*51. A camouflaged and deceptive perception distorted aircraft as in claim 47 and wherein:*
   *a) said coating is a dye on the bottom surface of said fuselage.*

* * * * *